(12) United States Patent
Gruhlke

(10) Patent No.: US 7,969,422 B2
(45) Date of Patent: Jun. 28, 2011

(54) PATTERN DETECTION SYSTEM

(75) Inventor: Russell W. Gruhlke, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 970 days.

(21) Appl. No.: 11/182,306

(22) Filed: Jul. 15, 2005

(65) Prior Publication Data
US 2007/0013679 A1   Jan. 18, 2007

(51) Int. Cl.
G06F 3/041   (2006.01)
(52) U.S. Cl. ......................... 345/173; 345/176
(58) Field of Classification Search .......... 345/173–179; 178/18.01–18.11, 19.01–19.07; 200/512; 340/407.1
See application file for complete search history.

(56) References Cited

U.S. PATENT DOCUMENTS

| | | | | |
|---|---|---|---|---|
| 4,340,300 A | * | 7/1982 | Ruell | 356/71 |
| 4,484,179 A | * | 11/1984 | Kasday | 345/176 |
| 5,401,916 A | * | 3/1995 | Crooks | 178/18.03 |
| 5,822,073 A | * | 10/1998 | Yee et al. | 356/445 |
| 6,061,177 A | * | 5/2000 | Fujimoto | 359/443 |
| 6,091,406 A | * | 7/2000 | Kambara et al. | 345/177 |
| 7,417,627 B2 | * | 8/2008 | Cok | 345/173 |

* cited by examiner

*Primary Examiner* — Kevin M Nguyen
*Assistant Examiner* — Kenneth B Lee, Jr.

(57) ABSTRACT

A detection system. The detection system includes a transparent substrate, an image sensor array, and a reflective layer. The substrate has first surface located opposite second surface and third surface located opposite fourth surface. The array is adjacent to the fourth surface. The reflective layer is adjacent to the third surface; the substrate is configured to receive light through the first surface; the second surface is configured to reflect the received light onto the third surface at a pre-selected angle of incidence; the reflective layer is configured such that the light creates surface plasmons whenever a first dielectric having a first refractive index is adjacent to the reflective layer; the reflective layer is configured to reflect the light onto the array whenever a second dielectric having a second refractive index is adjacent to the reflective layer; and the first refractive index differs from the second refractive index.

22 Claims, 3 Drawing Sheets

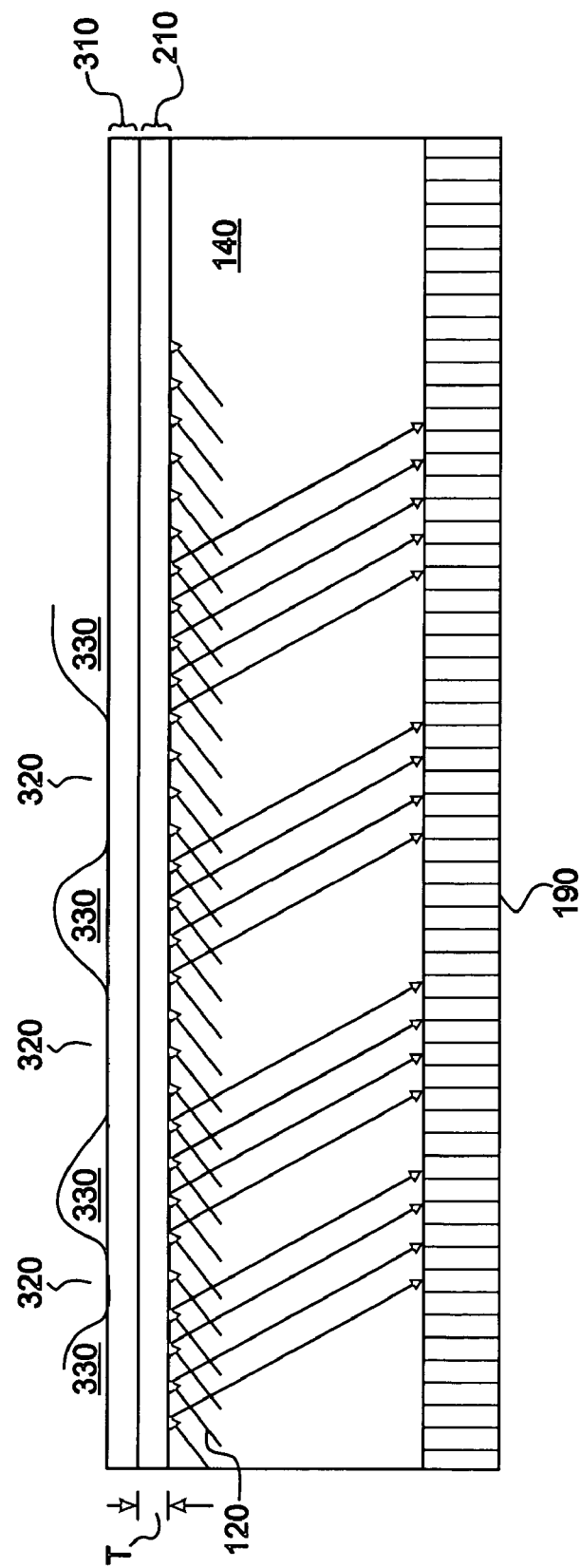

PATTERN DETECTION SYSTEM

BACKGROUND

A pointing device is a common component of a computer system by which an operator can control the computer using its graphical user interface (GUI). Various pointing devices have been developed over the years including joysticks, trackballs, mechanical mice, lightpens, and more recently optical mice for this purpose. In addition there are various types of digitizing tablets which typically employ a stylus.

The main goal of these pointing devices is to translate the motion of an operator's hand into signals that the computer can use. This is accomplished by displaying a cursor on the screen of the computer's monitor with the cursor moving in response to the user's hand movement. Commands that can be selected by the user are typically keyed to the location of the cursor. The desired command can be selected by first placing the cursor, via movement of the pointing device, at the appropriate location on the screen and then activating a button or switch on the pointing device.

Positional control of cursor placement on the monitor screen was initially obtained by mechanically detecting the relative movement of a joystick or a mouse with respect to a fixed frame of reference, which for a mouse could be the top surface of a desk or a mouse pad. A common technique is to use a ball inside a mouse which in operation touches the desktop or other surface and rolls when the mouse moves. Inside the mouse there are two rollers which touch the ball and roll as the ball rolls. One of the rollers is oriented so that it detects motion in a nominal X direction, and the other is oriented 90 degrees to the first roller so it detects motion in the associated Y direction. The rollers are connected to separate shafts, and each shaft is connected to a separate optical encoder which outputs an electrical signal corresponding to movement of its associated roller. This signal is appropriately encoded and sent typically as binary data to the computer which in turn decodes the signal it receives and moves the cursor on the computer screen by an amount corresponding to the physical movement of the mouse.

More recently, optical navigation techniques have been used to produce the motion signals that are indicative of relative movement along the directions of coordinate axes. These techniques have been used, for instance, in optical computer mice to replace conventional mice and trackballs, again for the position control of screen pointers in windowed user interfaces for computer systems. Such techniques have several advantages, among which are the lack of moving parts that accumulate dirt and that suffer from mechanical wear when used.

Motion in a system using optical navigation techniques is measured by tracking the relative displacement of a series of images. First, a two dimensional view of an area of the reference surface is focused upon an array of photo detectors, whose outputs are digitized and stored as a reference image in a corresponding array of memory. A brief time later a second image is digitized. If there has been no motion, then the pattern of the image obtained subsequent to the reference image and the pattern of the reference image are essentially identical. If, on the other hand, there has been some motion, then the pattern of the subsequent image will have been shifted along the axis of motion with the magnitude of the shift of the pattern of the image corresponding to the magnitude of physical movement of the array of photosensors. The optical mouse used in place of the mechanical mouse for positional control in computer systems employs this technique.

In practice, the direction and magnitude of movement of the optical mouse can be measured by comparing the pattern of the reference image to a series of shifted versions of the pattern of the second image. The shifted image corresponding best to the actual motion of the optical mouse is determined by performing a cross-correlation between the reference image and each of the shifted second images with the correct shift most likely providing the largest correlation value. Subsequent images can be used to indicate subsequent movement of the optical mouse using the method just described. Optical navigation sensors operate by obtaining a series of images of an underlying surface. This surface has a micro texture. When this micro texture is illuminated an image is obtained for comparison and movement detection.

Another recent device is the touch pad which was originally developed for use with laptop computers. Touch pads are sensitive to the touch of a user's finger. They permit a user to move a cursor on the computer screen merely by moving a finger tip across the surface of the touch pad. The presence of the user's finger is detected by an array of capacitive sensors arranged in a grid beneath the surface of the touch pad. Navigation of the cursor on the computer screen operates via capacitive coupling of the user's finger to the array of sensors. The user's finger slides over a sealed surface under which lie two layers of fine electrical conductors that are arranged in a grid and that create a surface electrical field. Touching the surface with a fingertip distorts the electrical field at that spot. The touching fingertip can be located by scanning the grid and sensing the strength of the distortion on each conductor. This technology, which is a form of capacitive-sensing, is referred to as field distortion sensing. Direction of the On Screen mouse or cursor is directly effected by movement of a person's finger tip on surface of the touch pad. Supporting software allows for customizing the acceleration of the mouse and for assigning mouse "click" and "drag-lock" functions as well. The size of such touch pads varies depending on manufacturer and model. Some are as small as a 2 inch by 2 inch rectangle.

SUMMARY

In representative embodiments, a detection system, comprises a substrate, an image sensor array, and a reflective layer. The substrate has a first surface located opposite a second surface and a third surface located opposite a fourth surface. The substrate is transparent. The image sensor array is adjacent to the fourth surface, and the array comprises multiple photosensitive elements. The reflective layer is adjacent to the third surface; the substrate is configured to receive light through the first surface; the light has a pre-selected wavelength; the second surface is configured to reflect the received light onto the third surface at a pre-selected angle of incidence; the reflective layer is configured such that the light creates surface plasmons whenever a first dielectric having a first refractive index is adjacent to the outer surface of the reflective layer; the reflective layer is configured to reflect the light onto the image sensor array whenever a second dielectric having a second refractive index is adjacent to the outer surface of the reflective layer; and the first refractive index differs from the second refractive index.

In other representative embodiments, a detection system, comprises a substrate, an image sensor array, a reflective layer, and a protective layer. The substrate has a first surface located opposite a second surface and a third surface located opposite a fourth surface. The substrate is transparent. The image sensor array is adjacent to the fourth surface. The array comprises multiple photosensitive elements; the reflective layer is adjacent to the third surface; and the protective layer is adjacent to the reflective layer. The reflective layer is interposed between the third surface and the protective layer; the substrate is configured to receive light through the first surface; the light has a pre-selected wavelength; the second surface is configured to reflect the received light onto the third surface at a pre-selected angle of incidence; the reflective layer is configured such that the light creates surface plasmons whenever a first dielectric having a first refractive index is adjacent to the surface of the protective layer located opposite the outer surface of the reflective layer; the reflective layer is configured to reflect the light onto the image sensor array whenever a second dielectric having a second refractive index is adjacent to the surface of the protective layer located opposite the outer surface of the reflective layer; and the first refractive index differs from the second refractive index.

Other aspects and advantages of the representative embodiments presented herein will become apparent from the following detailed description, taken in conjunction with the accompanying drawings.

BRIEF DESCRIPTION OF THE DRAWINGS

The accompanying drawings provide visual representations which will be used to more fully describe various representative embodiments and can be used by those skilled in the art to better understand them and their inherent advantages. In these drawings, like reference numerals identify corresponding elements.

FIG. 3 is another drawing of the side-view of the system of FIG. 1.

DETAILED DESCRIPTION

Figure 1:
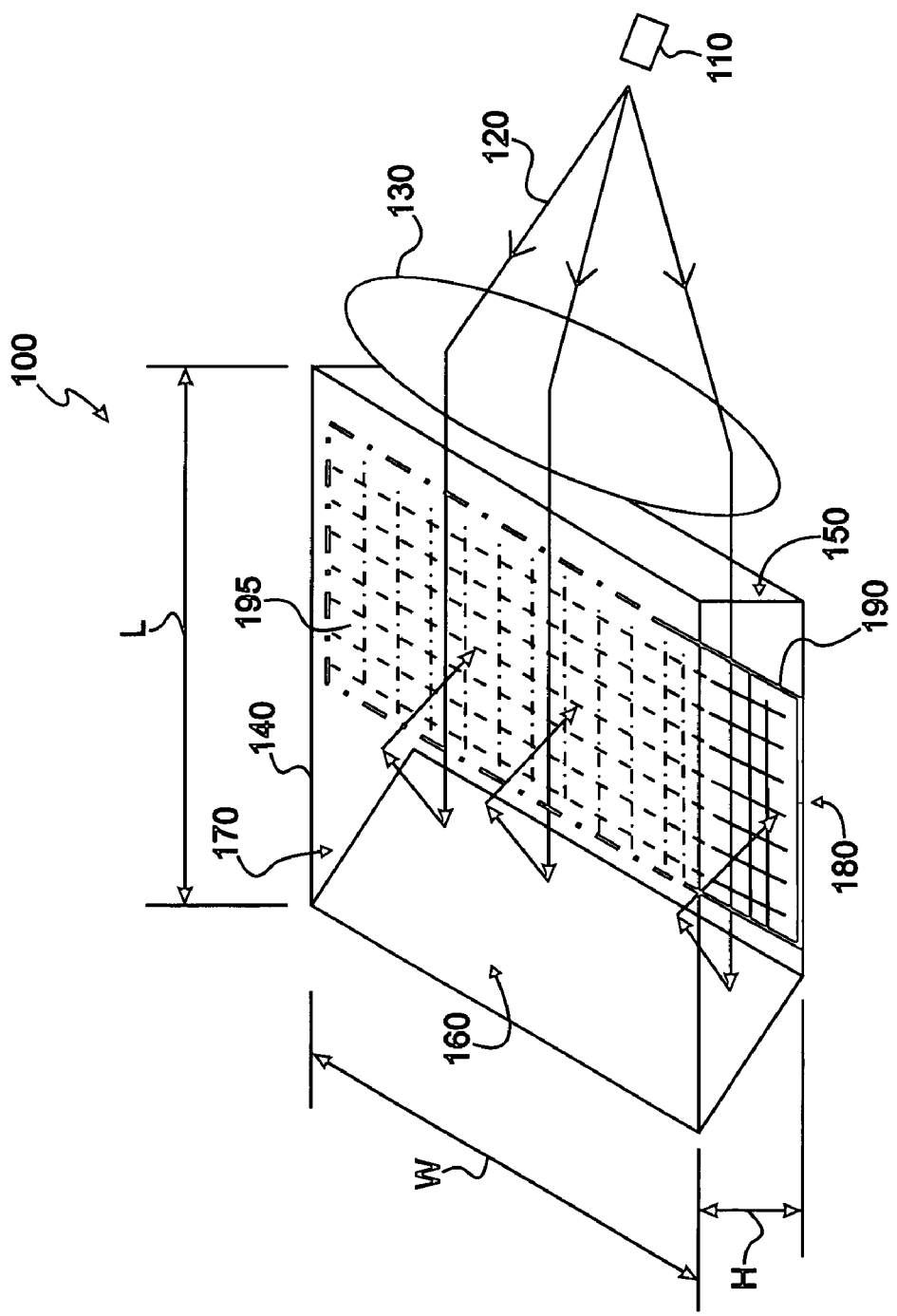
FIG. 1 is a drawing of a detection system as described in various representative embodiments.

As shown in the drawings for purposes of illustration, the present patent document discloses novel techniques for the detection of image patterns. In representative embodiments, light is incident at a pre-selected angle on a thin, conductive surface. Dependent upon the dielectric constant of those parts of an object in contact with the conductive surface, as well as the frequency of the incident light and the angle of incidence, plasmons can be created from the incident light via a quantum mechanical interaction at that surface. The creation of the plasmons reduces, if not eliminates, the intensity of the light that is reflected by the conductive surface. An image of the pattern made by the object in contact with the conductive surface can then be captured using an image sensor. Other image detection systems have depended upon capturing light reflected directly from an object and must be focused onto the image sensor.

Much of the human/device interfacing in commercial products such as cell phones depend upon mechanical rocker switches. The selection of a particular, pre-programmed electronic function is accomplished by pressing one side of a circular disk. Choices are limited to the four possible discrete rocker positions (up/down and left/right). Cell phones are now available with miniature displays which can provide various menus having various possible selections. In representative embodiments, systems are disclosed herein which provide the capability of interacting with such menus by movement of the user's finger on a surface. These embodiments can provide cursor motion on such a display that is similar to that of a personal computer mouse driven cursor movement. Thus, a navigation scheme is provided which uses finger motion to continuously "drive" the cursor.

In the following detailed description and in the several figures of the drawings, like elements are identified with like reference numerals.

FIG. 1 is a drawing of a detection system 100 as described in various representative embodiments. FIG. 1 is a three-dimensional view of the detection system 100, also referred to herein as system 100. In FIG. 1, a light source 110 emits light 120 which is collimated by lens 130 and strikes a first surface 150 of a substrate 140. The light 120 enters the substrate 140 which is transparent to the light 120 via the first surface 150 and travels through the body of the substrate 140 until it is reflected at a second surface 160. The reflection at the second surface 160 could be effected by light 120 incident at an angle greater than the critical angle such that total internal reflection of the light 120 occurs at the second surface 160 or alternatively by the second surface 160 being a mirrored surface. After reflection at the second surface 160, the light 120 travels to a third surface 170 of the substrate 140. At the third surface 170 the light 120 is again reflected or selectively converted into plasmons as explained in the following discussion. The pattern of reflected light 120 from the third surface 170 travels to a fourth surface 180 where it is captured by an image sensor array 190, also referred to herein as an image sensor 190, adjacent to the fourth surface 180. The image sensor array 190 is divided into pixels which comprise photosensitive elements 195. The detection system has a length L, a width W, and a height H. The values of these parameters are application dependent. However, typical values could be, for example, as follows: (1) approximately 30 millimeters (mm) for L, (2) approximately 30 mm for W, and (3) approximately 1 or 2 mm for H.

Figure 2:
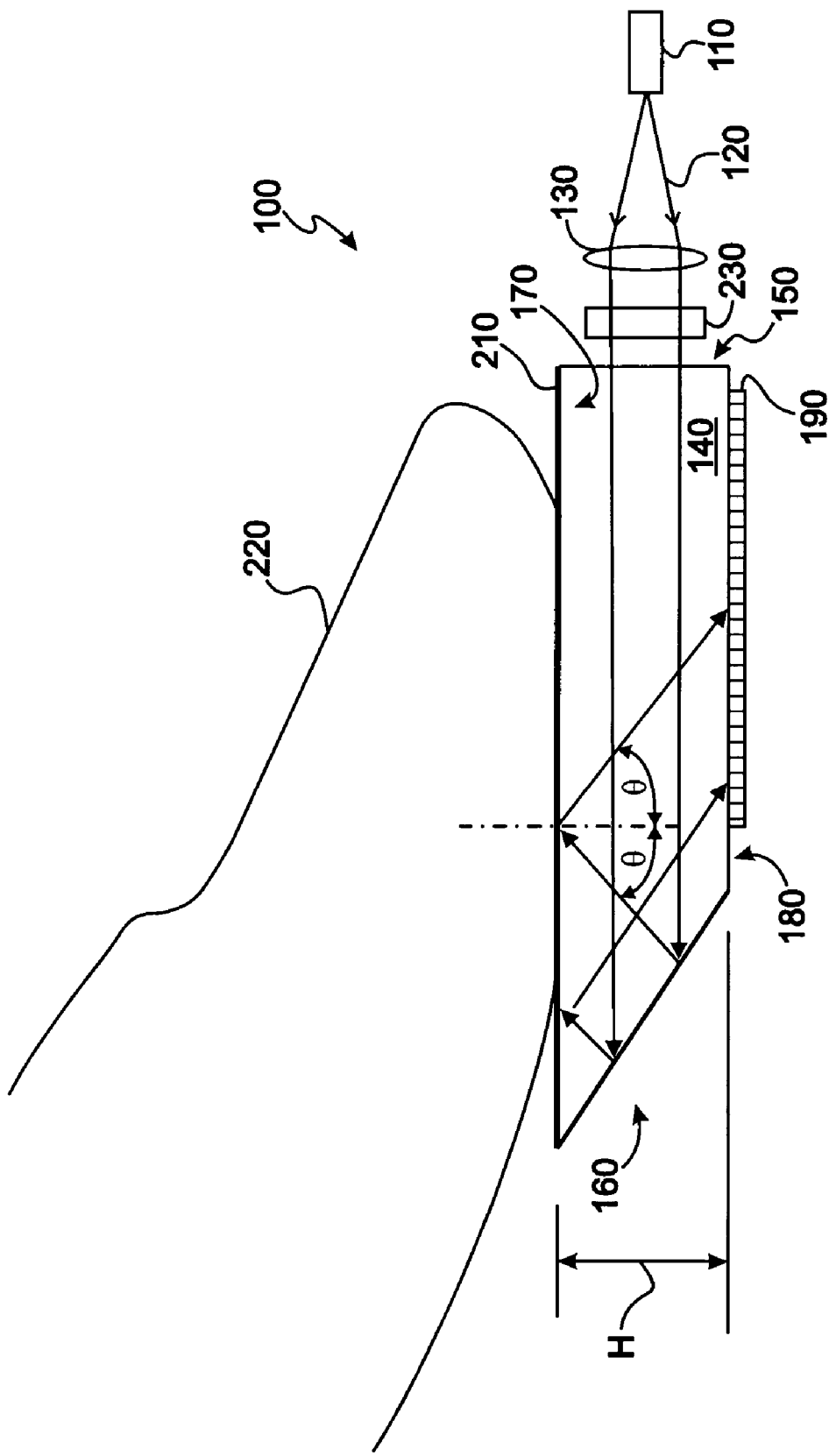
FIG. 2 is a drawing of a side-view of the detection system of FIG. 1.

FIG. 2 is a drawing of a side-view of the detection system 100 of FIG. 1. FIG. 2 again shows the light source 110 emitting light 120 which is collimated by lens 130. FIG. 2 also shows an optional polarizer 230 through which the light 120 passes prior to striking the first surface 150 of the substrate 140. The light 120 enters the substrate 140 via the first surface 150 and travels through the body of the substrate 140 until it is reflected at the second surface 160. As noted above, the reflection at the second surface 160 could be effected by means of light 120 incident at an angle greater than the critical angle such that total internal reflection of the light 120 occurs at the second surface 160 or alternatively by the second surface 160 being a mirrored surface. After reflection at the second surface 160, the light 120 travels to the third surface 170 of the substrate 140. As shown in FIG. 2, the second surface 160 is angled to be non-perpendicular with respect to the upper surface to the third surface 170 to reflect the light 120 onto the third surface 170. At the third surface 170 the light 120 is again reflected or selectively converted into plasmons, again as will be explained in the following discussion. At the third surface 170, the light 120 is incident at an angle of incidence θ. When reflected, the reflected light 120 is specular reflection such that the angle at which the light is reflected is equal to the angle of incidence θ. The pattern of the resulting composite reflected light 120 from the third surface 170 travels to the fourth surface 180 where it is captured by the image sensor 190 adjacent to the fourth surface 180. A reflective layer 210 is adjacent to and substantially covers the third surface 170 of the substrate 140. Also shown in FIG. 2 is an object 220 in contact with the reflective layer 210. The object 220 could be, for example, finger 220 as shown in FIG. 2.

The formation of plasmons occurs by means of a process called "Surface Plasmon Resonance." Surface Plasmon Resonance is a quantum mechanical effect which can occur when light interacts with a metal surface. Under certain conditions, energy is transferred from the photons that comprise the light 120 to packets of electrons called plasmons. The plasmons are created on the surface of the metal. In representative embodiments, the reflective layer 210 can function as the metal at which surface energy from the light 120 excites the plasmons. Since energy if absorbed from the light 120 in this process, the intensity of the light 120 reflected from the reflective layer 210 is less than it would otherwise be. This results in a pattern detected by the image sensor array 190 representative of that part of the object in contact with the reflective layer 210.

The light source 110 is preferably a laser, but could also be another source having a narrow bandwidth. In addition, an incoherent source such as a LED could be used. In this latter case, the polarizer 230 is useful for passing only p polarized light to the reflective layer 210. Surface plasmons are p polarized and, therefore, are excited only by p polarized light. This polarizer 230 can be placed between the lens 130 and the first surface 150 as shown in FIG. 2. The substrate could be glass or other transparent dielectric material. The reflective layer 210 is preferably a metal selected from the group consisting of silver, gold, copper, aluminum, sodium, and indium. However, other metals and conductors could also be used. The reflective layer 210 is preferably approximately 50 nanometers (nm) thick and is preferably deposited on the substrate 140 which could be glass. The reflective layer 210 may have a thin dielectric protective layer 310 (see FIG. 3) deposited on top of it.

When a surface plasmon state is supported in the reflective layer 210, the wavenumber $k_Z$ of the plasmons is given by the following equation, $$k_z = \left(\frac{2\pi}{\lambda}\right)\sqrt{\frac{n_d^2 n_m^2}{n_d^2 + n_m^2}}$$

wherein $\lambda$ is the wavelength of the incident light 120, $n_d$ is the refractive index of the medium above the metal film, and $n_m$ is the refractive index of the reflective layer 210. Light 120 incident onto the reflective layer 210 excites surface plasmons only if the wave numbers of both photonic states are equal. This can occur when light 120 is internally reflected at the interface between the substrate 140 and the reflective layer 210 as shown in FIG. 2. In which case, surface plasmons supported on the top side of the reflective layer 210 can be excited if the refractive index, $n_d$, is less than that for the substrate 140 medium. For a given wavelength $\lambda$, this occurs only for light 120 incident the reflective layer 210 at the resonance angle $\Theta_R$. The resonance angle $\Theta_R$ depends on the refractive indices of both the reflective layer 210 and a dielectric 320 (see FIG. 3) adjacent to the surface of the reflective layer 210. The resonance angle $\Theta_R$ is given in terms of the above $k_Z$ by $k_Z=(2\pi/\lambda)(n_S)\sin(\Theta_R)$ where $n_S$ is the refractive index of the substrate 140.

FIG. 3 is another drawing of the side-view of the system of FIG. 1. In FIG. 3 as in FIG. 2, the object 220 is shown as Finger 220. In FIG. 3, however, the finger 220 is shown in contact with the protective layer 310 which overlays the reflective layer 210. The reflective layer 210 has a thickness T which is typically approximately 200 angstroms. In the representative examples of FIGS. 2 and 3, the first dielectric 320 is finger 220 tissue which is shown explicitly in the more detailed drawing of FIG. 3 as fingerprint ridges 320 of which only parts are shown contacting the protective layer 310. The protective layer 310 is present in order to provide protection to the reflective layer 210 from mechanical and other damage. The tissue of the finger 220 has a typical refractive index, $n_F$, also referred to herein as a first refractive index, $n_F$, of approximately 1.40 which roughly corresponds to a mixture of 70% water and 30% protein. If the light 120 is incident on the reflective layer 210 at the third surface 170 of the substrate 140 at the appropriate surface plasmon resonance angle $\Theta_R$ which is determined, in part, by $n_F$, then surface plasmons are excited when the ridges of the finger 220 are pressed against the reflective layer 210 or alternatively against the protective layer 310, if the protective layer 310 is sufficiently thin. In these areas, the incident light 120 is absorbed upon exciting the highly attenuated surface plasmon state. Those areas of the protective layer 310, or alternatively the reflective layer 210, not touched by the fingerprint ridges 320 (the first dielectric 320) are in contact with a second dielectric 330 which could be air, dirt, water, oil, or other dielectric material and which could also be a vacuum. For the second dielectric 330 having sufficiently different second refractive index, $n_A$, surface plasmons are not excited and the incident light 120 is reflected from the reflective layer 210 towards the image sensor 190. The second dielectric 330 or possibly multiple other dielectrics 330 (dirt, water, oil, air, etc.) fill those areas between the tissues of the fingerprint ridges 320. If the second dielectric 330 comprises dielectric materials such as dirt, water, oil, and/or air, the second refractive index/indices $n_A$ will be sufficiently different from skin tissue and, therefore, will not support surface plasmons at the reflective layer 210 for the chosen angle of incidence, $\Theta_R$.

As discussed above, finger tissue has a refractive index $n_F$ of typically 1.40, whereas air has an index of refraction of approximately 1.0. Note that while a lens is needed to collimate the incident light 120 onto the first surface 150, it is not necessary to project an image of the finger onto the image sensor array 190. Surface plasmons essentially form a guided wave which is supported at a metal-to-dielectric interface (reflective layer 210 to first dielectric 320/protective layer 310). The excited plasmons create an electric field which extends approximately 100 nanometers both above and below the metal-to-dielectric interface of the side opposite the incident light 120. A plasmon has a short lifetime and propagates only a few microns. Thus, the surface plasmons form a highly attenuated electromagnetic wave. This condition which is called Surface Plasmon Resonance is caused by a coupling with a plane wave state (i.e., a radiation state which is the light 120). Surface plasmons can only be excited under certain conditions (wavelength and angle of incidence of the incident light 120 and the dielectric constant of the dielectric in contact with the reflective layer 210 or alternatively the thin protective layer 310 which lies on top of the reflective layer 210). Typically, a narrow spectrum of incident light 120 is desirable as otherwise it may be difficult to resolve the light/dark pattern of the finger 220 or other object 220. In representative embodiments, the design is such that in those areas wherein a ridge 320 of the finger 220 touches the top surface, resonance is obtained. The electric field of the plasmons decay exponentially away from the interface. It is that part of the plasmon that is excited in the metal that causes most or all of the absorption. Typically approximately 95% of incident light 120 can be absorbed at the ridges 320 of the finger 220. For air to excite plasmons, a different angle of incidence $\Theta$ would be required. Thus, a shadow pattern can be cast onto the image sensor array 190.

In representative embodiments, incident light 120 will not exit the reflective layer 210 unless an object, such as the finger 220, is present. In which case, whatever light 120 does exit the reflective layer 210 will be blocked from a user's view by the object 220 (the finger 220). As such, any concerns regarding eye safety caused by the light source 120 should be alleviated. Silver is the preferred material for the reflective layer 210 but gold, as well as other materials could be used. In those implementations needing a protective layer 310, a thin coating of another dielectric, for example silicon dioxide which adheres to silver or the like of approximately 200-500 angstroms in thickness could be deposited on the side of the reflective layer 210 opposite the third surface 170 of the substrate 140.

Thus, in those areas where skin tissue is touching the reflective layer 210, or alternatively the sufficiently thin protective layer 310 which is in contact with the reflective layer 210, surface plasmons are excited and there is no reflected radiation (light 120) propagating away from the metal film. Where skin tissue is not present, surface plasmons are not excited and the incident radiation (light 120) is reflected from the reflective layer 210. As a result, the pattern of skin and no skin on the top of the device is translated into shadows and bright spots, respectively, on the image sensor array 190. As such, the detection system 100 could be used for capturing an image of a fingerprint 320 (i.e., the ridges 320) of a finger 220 or the reflected pattern of another object 220.

Optical mice use optical navigation techniques to produce motion signals that are indicative of relative movement along the directions of coordinate axes. These optical techniques have been used for the position control of screen pointers in windowed user interfaces for computer systems. Such techniques have several advantages, among which are the lack of moving parts that suffer from mechanical wear and tear. Motion in such a system using optical navigation techniques is measured by tracking the relative displacement of a series of images. First, a two dimensional view of an area of the reference surface is captured by an array of photo detectors, whose outputs are digitized and stored as a reference image in a corresponding array of memory. A brief time later a second image is digitized. If there has been no motion, then the image obtained subsequent to the reference image and the reference image are essentially identical. If, on the other hand, there has been some motion, then the subsequent image will have been shifted along the axis of motion with the magnitude of the image shift corresponding to the magnitude of physical movement of the array of photosensors.

In practice, the direction and magnitude of movement of the optical mouse can be measured by comparing the reference image to a series of shifted versions of the second image. The shifted image corresponding best to the actual motion of the optical mouse is determined by performing a cross-correlation between the reference image and each of the shifted second images with the most likely correct shift providing the largest correlation value. Subsequent images can be used to indicate subsequent movement of the optical mouse using the method just described.

Thus, in representative embodiments, the action of optical mice can be reproduced using the detection system 100 wherein successive images of a user's finger touching the reflective layer 210 or alternatively the protective layer 310 captured by the image sensor array 190 can be captured and compared in order to determine the motion that occurs between captured images. When the finger 220 moves across the device, the associated bright and dark spot pattern on the image sensor array 190 shifts as well. Thus, two dimensional finger motion generates bright and dark moving fringes on the image sensor array 190. The change in fringe patterns can be analyzed and such motion correlated with electronic signals capable of shifting a curser in two dimensions.

In representative embodiments, detection systems 100 disclosed herein provide the capability of capturing images of patterns representative of those portions of an object 220 in contact with the reflective layer 210 or alternatively the protective layer 310 contiguous with the third surface 170 of the substrate 140 of the system 100. Such devices could be used to capture the pattern of fingerprints 320 or other objects 220. Such devices could also be used instead of switches which are used with menus in items such as cell phones to control the actions of the cell phone. Continuous cursor movement based on finger movement can be obtained.

In representative embodiments, a detection system 100, comprises a substrate 140, an image sensor array 190, and a reflective layer 210. The substrate 140 has a first surface 150 located opposite a second surface 160 and a third surface 170 located opposite a fourth surface 180. The substrate 140 is transparent. The image sensor array 190 is adjacent to the fourth surface 180, and the array 190 comprises multiple photosensitive elements 195. The reflective layer 210 is adjacent to the third surface 170; the substrate 140 is configured to receive light 120 through the first surface 150; the light 120 has a pre-selected wavelength; the second surface 160 is configured to reflect the received light 120 onto the third surface 170 at a pre-selected angle of incidence $\Theta$; the reflective layer 210 is configured such that the light 120 creates surface plasmons whenever a first dielectric 320 having a first refractive index $n_F$ is adjacent to the outer surface of the reflective layer 210; the reflective layer 210 is configured to reflect the light 120 onto the image sensor array 190 whenever a second dielectric 330 having a second refractive index $n_A$ is adjacent to the outer surface of the reflective layer 210; and the first refractive index $n_F$ differs from the second refractive index $n_A$.

In other representative embodiments, a detection system 100, comprises a substrate 140, an image sensor array 190, a reflective layer 210, and a protective layer 310. The substrate 140 has a first surface 150 located opposite a second surface 160 and a third surface 170 located opposite a fourth surface 180. The substrate 140 is transparent. The image sensor array 190 is adjacent to the fourth surface 180. The array 190 comprises multiple photosensitive elements 195; the reflective layer 210 is adjacent to the third surface 170; and the protective layer 310 is adjacent to the reflective layer 210. The reflective layer 210 is interposed between the third surface 170 and the protective layer 310; the substrate 140 is configured to receive light 120 through the first surface 150; the light 120 has a pre-selected wavelength; the second surface 160 is configured to reflect the received light 120 onto the third surface 170 at a pre-selected angle of incidence $\Theta$; the reflective layer 210 is configured such that the light 120 creates surface plasmons whenever a first dielectric 320 having a first refractive index $n_F$ is adjacent to the surface of the protective layer 310 located opposite the outer surface of the reflective layer 210; the reflective layer 210 is configured to reflect the light 120 onto the image sensor array 190 whenever a second dielectric 330 having a second refractive index $n_A$ is adjacent to the surface of the protective layer 310 located opposite the outer surface of the reflective layer 210; and the first refractive index $n_F$ differs from the second refractive index $n_A$.

In other representative embodiments, the detection system 100 could be constructed such that light 120 incident on the reflective layer 210 at the third surface 170 creates surface plasmons when the first dielectric 320 is air or other dielectric material, and light 120 incident on the reflective layer 210 at the third surface 170 is reflected when the second dielectric 330 is finger 220 tissue. In other representative embodiments, other materials may be used for the first dielectric 320 and the second dielectric 330.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims. In particular, the placement and movement of a finger 220 has been used in the above. However, it is also possible to detect patterns from objects 220 other than fingers 220.

What is claimed is:

1. A detection system, comprising:
   a substrate having a first side surface located opposite a second side surface and an upper surface located opposite a lower surface, wherein the substrate is transparent,
   an image sensor array adjacent to the lower surface, wherein the array comprises multiple photosensitive elements; and
   a reflective layer over the upper surface, wherein the substrate is configured to receive light through the first side surface, wherein the light has a pre-selected wavelength, wherein the second side surface is configured to reflect the received light onto the upper surface at a pre-selected angle of incidence, wherein the second side surface is angled to be non-perpendicular with respect to the upper surface to reflect the received light onto the upper surface, wherein the reflective layer is configured such that the light creates surface plasmons whenever a first dielectric having a first refractive index is adjacent to the outer surface of the reflective layer, wherein the surface plasmons produce a pattern that is imaged by the image sensor array for detection, wherein the reflective layer is configured to reflect the light onto the image sensor array whenever a second dielectric having a second refractive index is adjacent to the outer surface of the reflective layer, and wherein the first refractive index differs from the second refractive index.

2. The detection system as recited in claim 1, further comprising:
   a light source, wherein the light source is configured to emit the light.

3. The detection system as recited in claim 2, wherein the light source is a laser.

4. The detection system as recited in claim 2, further comprising:
   a lens, wherein the lens is configured to collimate the light onto the first side surface.

5. The detection system as recited in claim 2, further comprising:
   a polarizer located between the light source and the first side surface.

6. The detection system as recited in claim 1, wherein the second side surface is configured for total internal reflection of the light.

7. The detection system as recited in claim 1, wherein the second side surface is a mirrored surface.

8. The detection system as recited in claim 1, wherein the first dielectric comprises at least one ridge of a finger.

9. The detection system as recited in claim 1, wherein the first dielectric is selected from the group consisting of finger tissue and air.

10. The detection system as recited in claim 1, wherein the second dielectric is selected from the group consisting of finger tissue and air.

11. The detection system as recited in claim 1, wherein the reflective layer is positioned on the upper surface such that at least some of the upper surface is covered by the reflective layer, and wherein the reflective layer is made of metal or conductor.

12. A detection system, comprising:
    a substrate having a first side surface located opposite a second side surface and an upper surface located opposite a lower surface, wherein the substrate is transparent,
    an image sensor array adjacent to the lower surface, wherein the array comprises multiple photosensitive elements; and
    a reflective layer over the upper surface; and
    a protective layer over the reflective layer, wherein the reflective layer is interposed between the upper surface and the protective layer, wherein the substrate is configured to receive light through the first side surface, wherein the light has a pre-selected wavelength, wherein the second side surface is configured to reflect the received light onto the upper surface at a pre-selected angle of incidence, wherein the second side surface is angled to be non-perpendicular with respect to the upper surface to reflect the received light onto the upper surface, wherein the reflective layer is configured such that the light creates surface plasmons whenever a first dielectric having a first refractive index is adjacent to the surface of the protective layer located opposite the outer surface of the reflective layer, wherein the surface plasmons produce a pattern that is imaged by the image sensor array for detection, wherein the reflective layer is configured to reflect the light onto the image sensor array whenever a second dielectric having a second refractive index is adjacent to the surface of the protective layer located opposite the outer surface of the reflective layer, and wherein the first refractive index differs from the second refractive index.

13. The detection system as recited in claim 12, further comprising:
    a light source, wherein the light source is configured to emit the light.

14. The detection system as recited in claim 13, wherein the light source is a laser.

15. The detection system as recited in claim 13, further comprising:
    a lens, wherein the lens is configured to collimate the light onto the first side surface.

16. The detection system as recited in claim 13, further comprising:
    a polarizer located between the light source and the first side surface.

17. The detection system as recited in claim 12, wherein the second side surface is configured for total internal reflection of the light.

18. The detection system as recited in claim 12, wherein the second side surface is a mirrored surface.

19. The detection system as recited in claim 12, wherein the first dielectric comprises at least one ridge of a finger.

20. The detection system as recited in claim 12, wherein the first dielectric is selected from the group consisting of finger tissue and air.

21. The detection system as recited in claim 12, wherein the second dielectric is selected from the group consisting of finger tissue and air.

22. The detection system as recited in claim 12, wherein the reflective layer the reflective layer is positioned on the upper surface such that at least some of the upper surface is covered by the reflective layer, and wherein the reflective layer is made of metal or conductor.

* * * * *